US008825611B1

(12) United States Patent (10) Patent No.: US 8,825,611 B1
Jorgensen et al. (45) Date of Patent: Sep. 2, 2014

(54) POLICY ENABLED INFORMATION SHARING SYSTEM

(75) Inventors: Craig R. Jorgensen, Albuquerque, NM (US); Brian D. Nelson, Albuquerque, NM (US); Steve W. Ratheal, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 171 days.

(21) Appl. No.: 12/686,191

(22) Filed: Jan. 12, 2010

(51) Int. Cl.
*G06F 17/30* (2006.01)
(52) U.S. Cl.
USPC .......................................... 707/694; 707/781
(58) Field of Classification Search
USPC ............... 707/694, 781–783; 726/1, 5, 27, 17
See application file for complete search history.

(56) References Cited

U.S. PATENT DOCUMENTS

2002/0103869 A1* 8/2002 Goatly et al. ................. 709/206
2007/0255745 A1* 11/2007 Gargi ........................... 707/102
2010/0049974 A1* 2/2010 Winjum et al. ............... 713/166

OTHER PUBLICATIONS

Harold Relyea et al., "Information Sharing for Homeland Security: A Brief Overview", The Library of Congress, Jan. 2005, 38 pages.*
Charles E. Phillips et al., "Information Sharing and Security in Dynamic Coalitions", SACMAT 02, Jun. 2002, pp. 87-96.*
Geambasu, Roxana et al., "Vanish: Increasing Data Privacy with Self-Destructing Data", In Proceedings of the USENIX Security Symposium, Aug. 2009, Montreal, Canada, 17 pages.
Naraine, Ryan, "Is There Room for a Security Browser?", Security Hardware & IT Security Software, Mar. 26, 2008, 2 pages.
HSIN Outreach Team, Homeland Security Information Network, retrieved from Internet on Dec. 4, 2009, last modified on Aug. 4, 2009, pp. 1-2, <www.dhs.gov/files/programs/gc_1156888108137.shtm>, United States.
No Author Listed, XACML, Wikipedia, retrieved from Internet on Dec. 4, 2009, last modified Nov. 7, 2009, <http://en.wikipedia.org/wiki/XACML>, pp. 1-4, Wikimedia Foundation, Inc., United States.
No Author Listed, Bell-La Padula model, Wikipedia, retrieved from Internet on Dec. 21, 2009, last modified Nov. 7, 2009, <http://en.wikipedia.org/wiki/Bell-LaPadula model>, pp. 1-3. Wikimedia Foundation, Inc., United States.
No Author Listed, Access Control, Wikipedia, retrieved from Internet on Dec. 21, 2009, last modified.Dec. 17, 2009, <http://en.wikipedia.org/wiki/Access_control>, pp. 1-13, Wikimedia Foundation, Inc., United States.
No Author Listed, DataPortability, Wikipedia, retrieved from Internet on Dec. 21, 2009, last modified Nov. 22, 2009, <http://en.wikipedia.org/wiki/DataPortability>, pp. 1-3, Wikimedia Foundation, Inc., United States.
No Author Listed, Information assurance, Wikipedia, retrieved from Internet on Dec. 21, 2009, last modified Dec. 16, 2009, <http://en.wikipedia.org/wiki/Information_assurance>, Wikimedia Foundation, Inc., United States.
No Author Listed, Multilevel security, Wikipedia, retrieved from Internet on Dec. 21, 2009, last modified.Dec. 21, 2009, <http://en.wikipedia.org/wiki/Multilevel_security>, pp. 1-6, Wikimedia Foundation, Inc., United States.

* cited by examiner

*Primary Examiner* — Monica Pyo
(74) *Attorney, Agent, or Firm* — Daniel J. Jenkins

(57) ABSTRACT

A technique for dynamically sharing information includes executing a sharing policy indicating when to share a data object responsive to the occurrence of an event. The data object is created by formatting a data file to be shared with a receiving entity. The data object includes a file data portion and a sharing metadata portion. The data object is encrypted and then automatically transmitted to the receiving entity upon occurrence of the event. The sharing metadata portion includes metadata characterizing the data file and referenced in connection with the sharing policy to determine when to automatically transmit the data object to the receiving entity.

16 Claims, 6 Drawing Sheets

POLICY ENABLED INFORMATION SHARING SYSTEM

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to information sharing, and in particular but not exclusively, relates to secure information sharing.

BACKGROUND INFORMATION

Today's decision-makers are challenged by a continually evolving environment that reduces their ability to make timely and effective decisions. There is increased complexity involved when multiple agencies are responsible for the collection, analysis, and dissemination of critical information and decisions/orders. Over time, barriers were constructed to prevent the unauthorized use and dissemination of information. These barriers now add to the delay, and sometimes even block, information sharing, which makes it difficult to assimilate information and promulgate timely directives of decision makers at the appropriate level.

By Presidential Directive (NSPD-51/HSPD20), various agencies of the government are tasked to share critical information. There are many diverse agency communications infrastructures that exist with various "Common Operation Pictures" (COP), but the information transport technology does not exist among these infrastructures to support the diversity by allowing data/information/decision sharing.

One conventional technique for sharing information is a central information repository. These centralized databases enable users to log in, drop information into the repository, and retrieve information from the repository. One advantage of the central information repository is that it relieves the users from the burden of managing the shared information. However, once information has been dropped into the repository, the users often lose control over its dissemination. For confidential shared databases, the bureaucracy needed to manage and validate a large number of users can be complex.

Another conventional technique includes simple point-to-point bi-lateral information sharing agreements. However, point-to-point strategies tend to be ad-hoc, prone to mistakes, and fail to leverage information infrastructure investments from agreement to the next.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for policy enabled information sharing are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A need exists to facilitate the safe, secure, and timely sharing of information between a diverse set of individuals, organizations, or government entities in a seamless, low overhead, and flexible manner. Embodiments of the information sharing technique described below provide the capability to organize and deliver information for inter/intra agency/organization disclosure, based upon agreed policies (e.g., need-to-know policies), sorted at various levels of classification/confidentiality, and which is capable of promulgating the information in real-time based upon the pre-defined policies.

Figure 1:
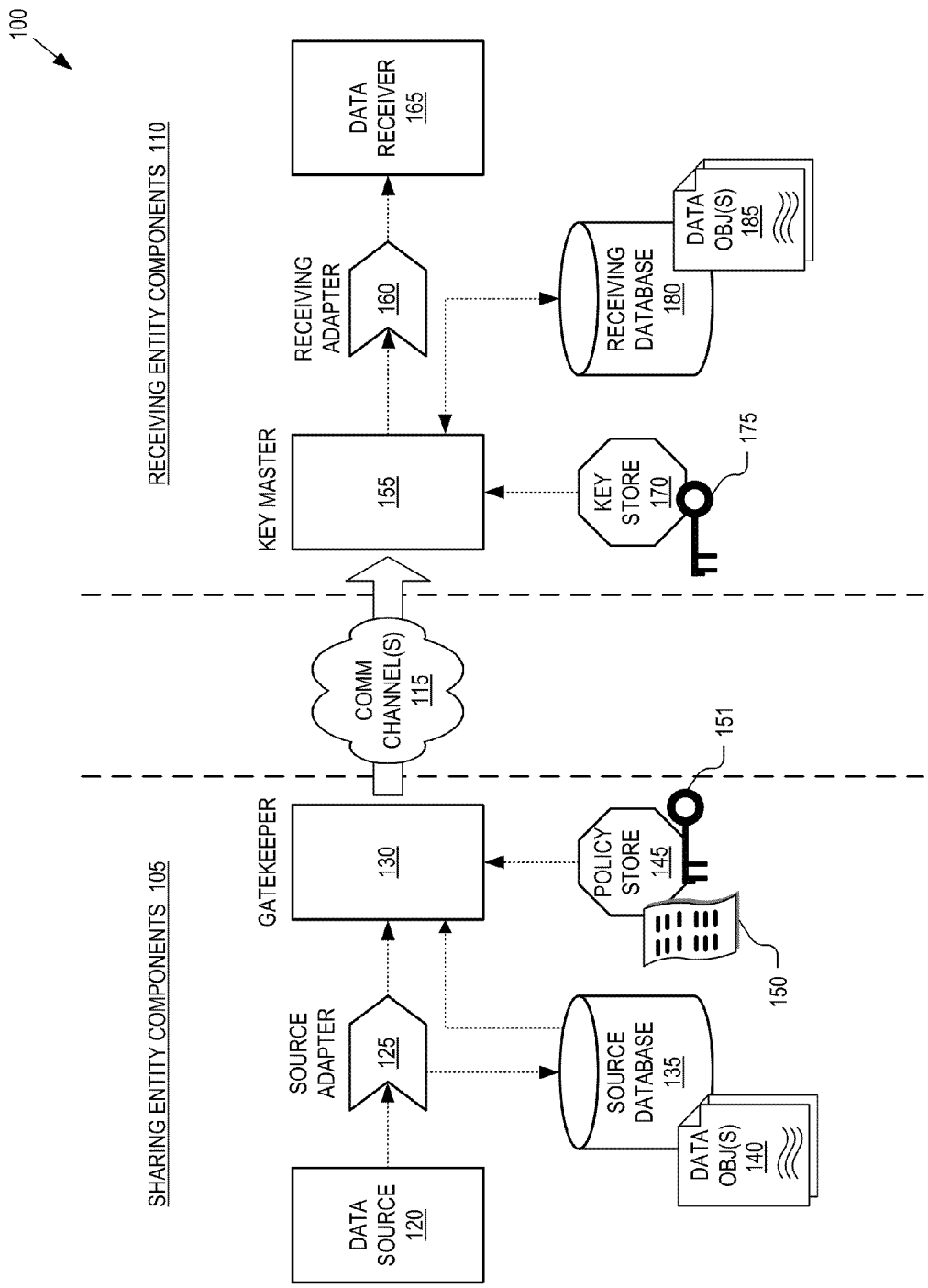
FIG. 1 is a functional block diagram illustrating components of a policy enabled information sharing system, in accordance with an embodiment of the invention.

FIG. 1 is a functional block diagram illustrating components of a policy enabled information sharing system 100, in accordance with an embodiment of the invention. Information sharing system 100 includes sharing entity components 105 and receiving entity components 110, interconnected via one or more communication channels 115. The illustrated embodiment of sharing entity components 105 includes a data source 120, a source adapter 125, a gatekeeper 130, a source database 135 for storing data objects 140, and a policy store 145 for storing policies 150 and encryption keys 151. In an alternative embodiment, encryption keys 151 may be stored in a separate sharing side key store (not illustrated). The illustrated embodiment of receiving entity components 110 includes a key master 155, a receiving adapter 160, a data receiver 165, a key store 170 for storing decryption keys 175, and a receiving database 180 for storing data objects 185.

FIG. 1 illustrates a unidirectional portion of information sharing system 100. However, if two entities wish to enable bidirectional information sharing, then each entity may include local instances of both sharing entity components 105 and receiving entity components 110.

Communication channel 115 may be implemented with a variety of different communication mediums. For example, communication channel 115 may be implemented as a point-to-point link between the sharing entity and the receiving entity. Alternatively, communication channel 115 may be implemented as a local area network ("LAN"), a wide area network ("WAN") (e.g., the Internet), a metro area network ("MAN"), a wired or wireless network, or otherwise. Communication channel 115 may link different divisions or offices of a single organization (e.g., different Federal or State entities of the US governmental structure) or different cooperating organizations (e.g., corporations working on joint ventures, the US government and private contractors, etc.). Although FIG. 1 illustrates communication channel 115 as unidirectional, it should be appreciated that each of the collaborating entities may include both sharing entity components 105 and receiving entity components 110 for bidirectional information sharing and as such, communication channel 115 may support bidirectional data flow.

Data source 120 is a functional block representing various sources of information or data files. Data source 120 may be a text editor program or a graphic editor program having the capability to mark the information included with visibility attributes (discussed below in connection with FIG. 3). For example, data source 120 may be implemented using MS Word with a plug-in adding a feature for enabling the end-user to select content portions (e.g., words, sentences, paragraphs, pages, chapters, images, etc.) and mark or tag the selected portion with one or more visibility attributes. These visibility attributes are then used by source adapter 125 and gatekeeper 130 to control with whom the various content portions may be shared.

Figure 4:
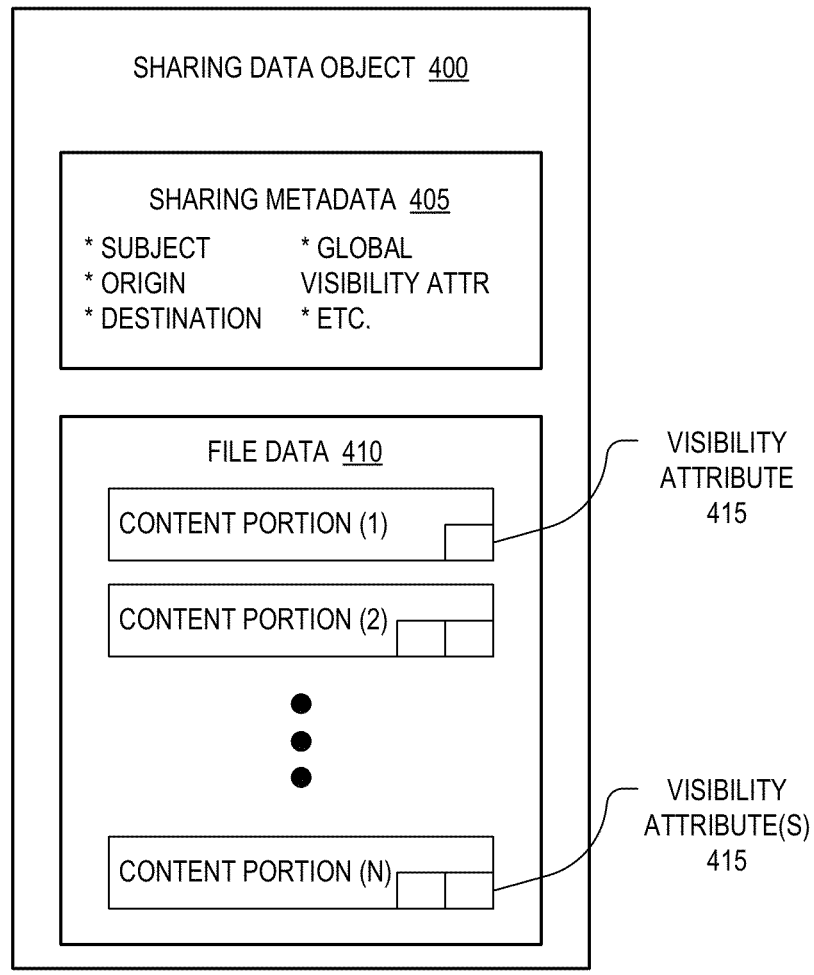
FIG. 4 illustrates a sharing data object, in accordance with an embodiment of the invention.

Source adapter 125 is a functional block representing one or more modules capable of parsing the data file marked with the visibility attributes and generating a data object having a standardized format (discussed below in connection with FIG. 4). Source adapter 125 may store the formatted data object into source database 135 for quick recall at a later date, or may immediately provide the data object to gatekeeper 130 for immediate sharing/distribution without storing the data object into source database 135.

Gatekeeper 130 is a functional block representing one or more modules for executing sharing policies 150 and encrypting data objects prior to distribution. In one embodiment, gatekeeper 130 executes sharing policies 150 by actively monitoring various inputs to determine whether specific sharing events have occurred, and if so, automatically takes the appropriate sharing action(s). Such sharing actions may include pushing specified data objects to selected recipients, revoking sharing privileges of certain receiving entities (e.g., by revoking decryption keys), promoting access privileges or authorization credentials of specified receiving entities, or the like.

Pushing specified information out and/or promoting/demoting access privileges of specified recipients in response to the occurrence of an event implements a need-to-know sharing policy. For example, the occurrence of an event may be a terrorist threat warning or a natural disaster. In response to these types of events, certain government agencies may want to share critical, time sensitive information with other government agencies, which during normal times is not typically shared. In another example, the event may be related to the location of a vehicle convoy in a battle field environment, whereby hostile and friendly combatant location information is pushed out to the convoy on a need-to-know basis as the convoy traverses the battle field or enemy territory.

Sharing entity components 105 may be installed and executed on one or more physical machines. For example, each computer authorized to share information may include its own instance of a data source 120, and source adapter 125, while a single gatekeeper 130 and policy store 145 are shared between the multiple instances. Alternatively, each computer may also include its own instance of gatekeeper 130 and policy store 145. Alternative installation configurations may be used.

Key master 155 is a functional block representing one or more modules for managing decryption keys 175 and receiving and decrypting data objects. Key master 155 receives the data objects distributed from one or more gatekeepers 130 via communication channel(s) 115. In response, key master 115 retrieves one or more decryption keys 175 from key store 170 to decrypt content portions within the data object and passes the data objects with decrypted content portions to receiving adapter 160. Alternatively, key master 155 may store data objects 185 with encrypted content portions into receiving database 180 for subsequent recall by data receiver 165. In one embodiment, key master 155 also manages key store 170 by retrieving and storing new decryption keys, renewing expired decryption keys, etc.

Receiving adapter 160 is a functional block representing one or more modules for reformatting the data objects back into data files for use by the data receiver 165. The receiving adapter 160 may return data objects to the original format as generated by data source 120. Alternatively, if data receiver 165 operates on data using different formatting rules than data source 120, then receiving adapter 160 converts the data object to a file format that is compliant with data receiver 165. Accordingly, data objects operate as a sort of universal sharing format while source adapter 125 and receiving adapter 160 operate as format translators converting between the universal sharing format of the data objects and the proprietary or various standards used by data source 120 and data receiver 165. In one embodiment, the data objects are extensible markup language ("XML") files.

Receiving entity components 110 may be installed and executed on one or more physical machines. For example, each computer authorized to receive shared information may include its own instance of a data receiver 165 and receiving adapter 160, while a single key master 155 and key store 170 are shared between the multiple instances. Alternatively, each computer may also include its own instance of key master 155 and key store 170. Alternative configurations may be used.

Figure 2:
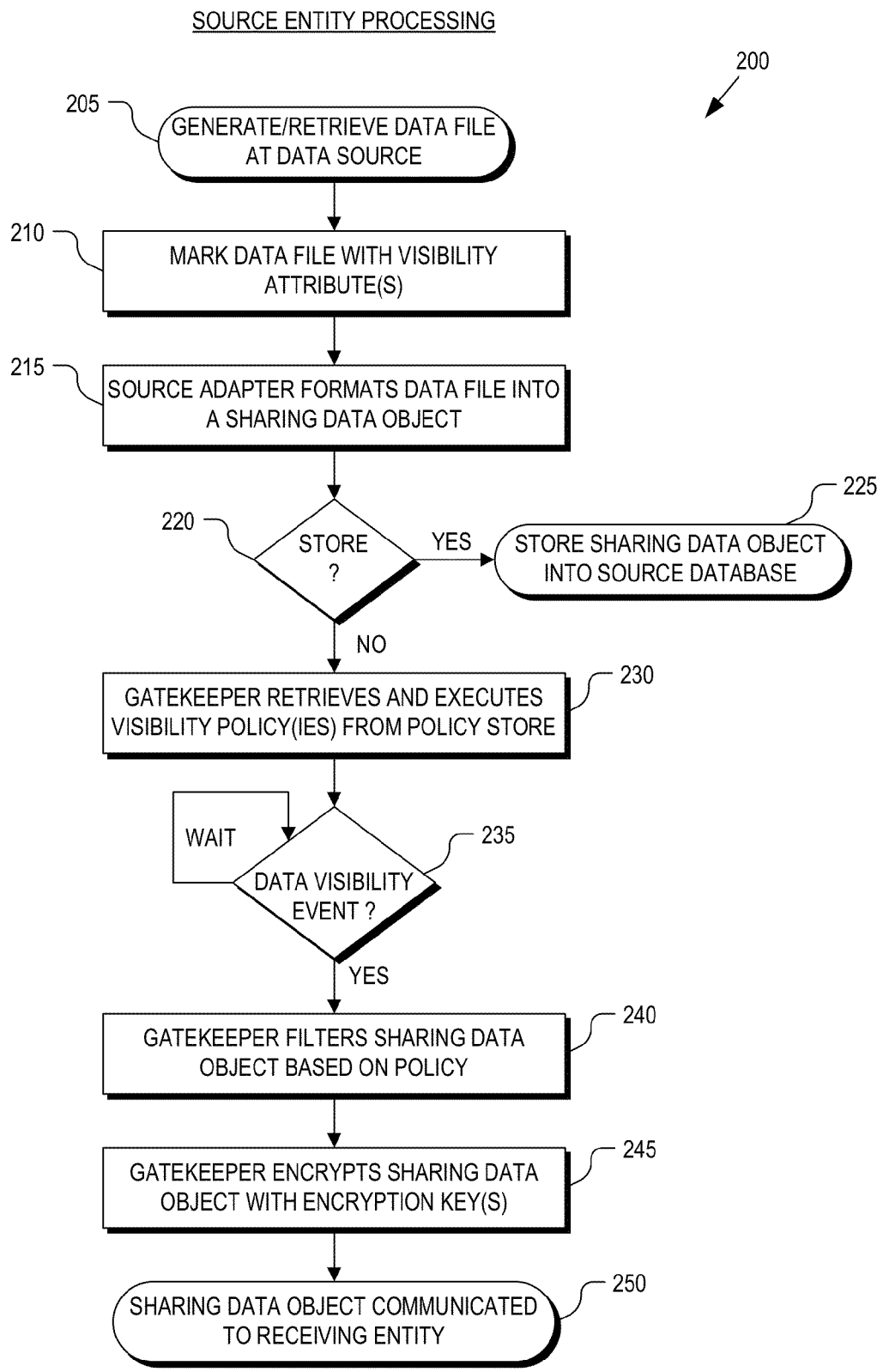
FIG. 2 is a flow chart illustrating source side processing of a policy enabled information sharing system, in accordance with an embodiment of the invention.

FIG. 2 is a flow chart illustrating a sharing side process 200 for implementing policy enabled information sharing system 100, in accordance with an embodiment of the invention. Process 200 is described with reference to FIGS. 1, 3, and 4. The order in which some or all of the process blocks appear in process 200 should not be deemed limiting. Rather, one of ordinary skill in the art having the benefit of the present disclosure will understand that some of the process blocks may be executed in a variety of orders not illustrated.

Figure 3:
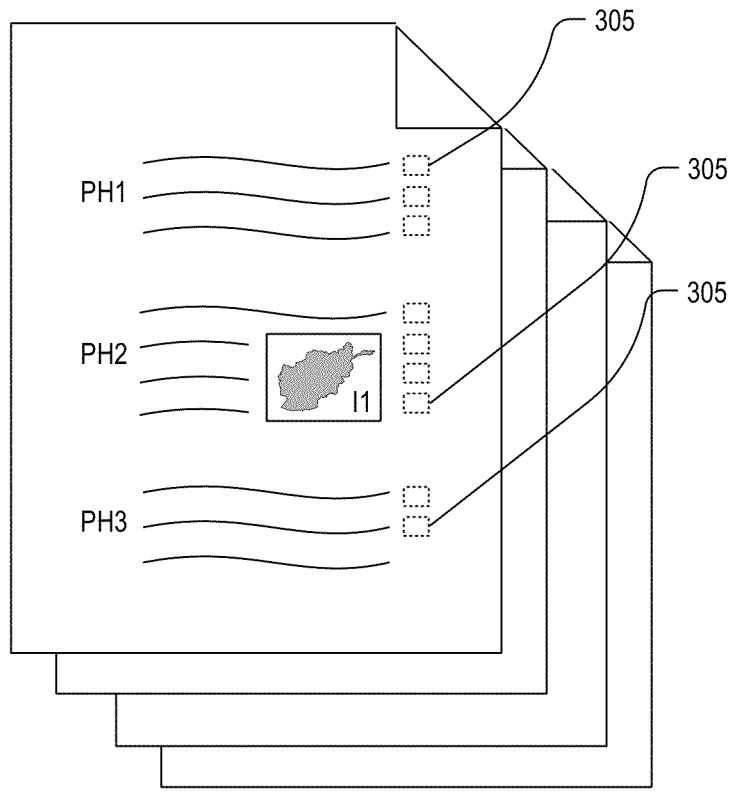
FIG. 3 illustrates a data file capable of being tagged with visibility attributes, in accordance with an embodiment of the invention.

In a process block 205, data source 120 retrieves or otherwise generates a data file for sharing. The data file may include a variety of different forms or types of data including text, images, or video. FIG. 3 illustrates an example data file 300 including text and image content portions. The illustrated embodiment of data file 300 represent a multipage document including textual words, sentences, and paragraphs (e.g., paragraphs PH1, PH2, and PH3) and an image I1.

In a process block 210, data source 120 is used to mark data file 300 with various visibility attributes 305. The visibility attributes represent metadata for providing differentiated visibility scopes or graduated privileged access to the marked content portions. Individual words, sentences, paragraphs, pages, chapters, embedded images, and embedded videos can be marked with a visibility attribute. The visibility attribute can correspond to one or more levels of authorization credentials. For example, in a three level (L1, L2, L3) differentiated visibility hierarchy, each content portion can be marked with either a L1, L2, or L3 visibility attribute. These visibility attribute tags can subsequently be used to encrypt or filter different content portions of data file 300 with different keys, thereby providing selective restricted access within a single file or document.

In a process block 215, source adapter 125 formats data file 300 into a sharing data object. FIG. 4 illustrates a sharing data object 400, in accordance with an embodiment of the invention. In one embodiment, sharing data object 400 has a specified format which is well suited for distribution over communication channel 115 and universally recognized by all gatekeepers 130, key masters 155, and receiving adapters 160 within information sharing system 100. In one embodiment, source adapter 125 uses XML syntax to generate sharing data objects.

The illustrated embodiment of sharing data object 400 includes a sharing metadata portion 405 and a file data portion 410. Sharing metadata portion 405 is populated by source adapter 125 with metadata that characterizes data file 300 from which sharing data object 400 was generated. The sharing metadata is used in connection with sharing policy 150 by gatekeeper 130 to determine when and to whom sharing data object 400 should be distributed. File data portion 410 is populated by source adapter 125 with content portions (e.g., content portions 1-N) from data file 300 and represent the data content itself.

Sharing metadata 405 may include a variety of metadata either extracted from data file 300 or solicited from a user either by source adapter 125 at formatting time or at the time of marking data file 300 with visibility attributes 305. Example metadata 405 includes a subject field, an origin or source field, a destination field, a global visibility attribute, or otherwise. The subject field may include a brief subject matter description of data file 300, the origin field may identify the author of data file 300 or the sharing entity, the destination field may include a list of intended recipients for data file 300, the global visibility attribute may include a general security level indication for the entire data file 300. Of course, other metadata characterizing data file 300 or providing sharing information related to data file 300 may also be included within sharing metadata portion 405.

In one embodiment, content portions are grouped with reference to visibility attributes 305. For example, if a user selects paragraph PH1 and assigns a single visibility attribute 305 to it, then paragraph PH1 would be parsed into content portion (1) and tagged with a visibility attribute 415 corresponding to the associated visibility attribute 305. If the user selects a single sentence or image separately and assigns corresponding visibility attributes 305, then the sentence or image would be populated into separate content portions along with visibility attributes 415. If the user assigned multiple visibility attributes 305 to the same content portion of data file 300, then multiple visibility attributes 415 may also be tagged to the associated content portion within sharing data object 400.

Once sharing data object 400 has been generated by source adapter 125, the data object can either be stored into source database 135 as a data object 140 (decision block 220 and process block 225) and/or delivered to gatekeeper 130 for immediate distribution to one or more recipients.

In a process block 230, gatekeeper 130 loads one or more sharing policies 150 from policy store 145. Sharing policies 150 instruct gatekeeper 130 to monitor for certain data visibility events, and if such an event occurs, which information to distribute and to which recipients. Accordingly, distribution of sharing data objects is instigated in response to data visibility events (decision block 235). A data visibility event may be a push event where a user within the sharing entity desires to push information out to one or more recipients or a pull event where a recipient requests the information. Some visibility events (push or pull) may also be the result of a need-to-know event automatically determined based on a sharing policy and the occurrence of a specified event. In one embodiment, these policy based visibility events are controlled by gatekeeper 130 with reference to policies 150 residing within policy store 145 and sharing metadata 405 within sharing data objects 400.

For example, in the event of a hurricane, certain governmental agencies may have a need-to-know certain critical time sensitive information. FEMA may need to push out real-time coordination efforts, maps, and weather data to the coast guard and state and local emergency responders. The type of information (data objects) and specific recipients (destination field within sharing metadata 405) may be specified in advanced. The specific sharing policy may delineate a number of data visibility events that trigger automatic distribution of this need-to-know information. The visibility attributes 415 may further be used to restrict access to specific information. For example, geographic maps and real-time satellite imagery of sensitive government buildings may be distributed to the coast guard or National Guard, while being withheld from state and local responders. This differentiated visibility scope is determined by the visibility attributes 415 and the sharing policies 150.

In one embodiment, for each instance of a data object distributed gatekeeper 130 compares the authorization credentials of the intended recipient with visibility attributes 415. If the particular content portion is tagged with a visibility attribute requiring a higher or distinct level of authorization credentials than possessed by the recipient, then the particular content portion is removed or filtered out of the data object prior to transmission (process block 240). As such, in some embodiments, some recipients (as identified in the destination field within sharing metadata 405) may receive different content portions than other recipients. In other words, gatekeeper 130 may remove or omit content portions from one instance of the data object sent to a first intended recipient based on their authorization credentials while including those content portions for other recipients due to their higher or separate authorization credentials.

In a process block 245, the content data portions are encrypted with encryption keys 151 prior to transmission across communication channel 115. In one embodiment, gatekeeper 130 determines which encryption key 151 to use with reference to visibility attributes 415 to further control or limit visibility to sensitive information. In one embodiment, gatekeeper 130 does not filter any content portions from file data portion 410, but rather relies upon differentiated encryption keys 151 to control visibility scopes of content within a given data object and across different data objects. In one embodiment, both filtering and differentiated encryption keys are used.

Finally, in a process block 250, the encrypted data object is distributed to the receiving entity across communication channel 115.

Figure 5:
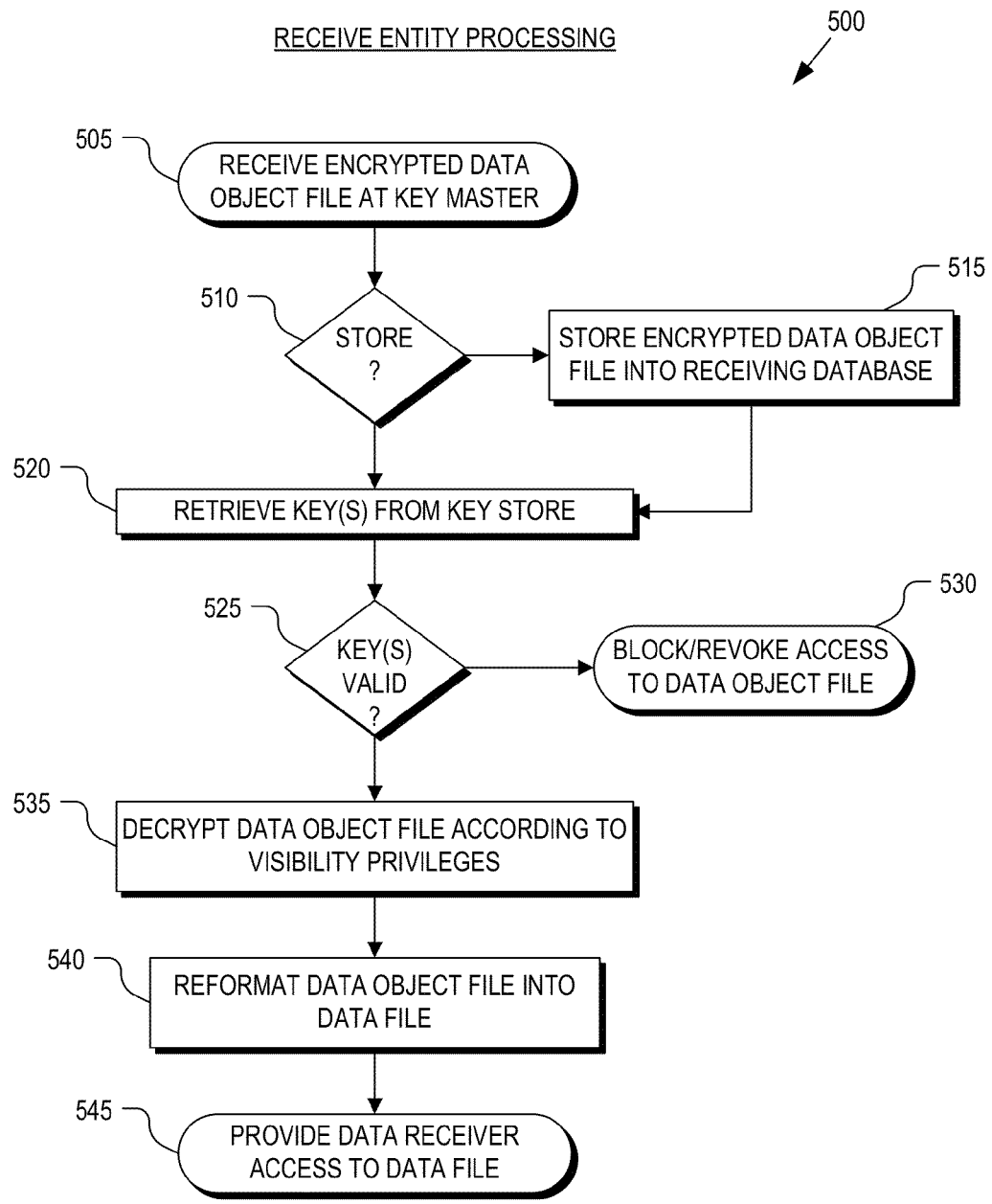
FIG. 5 is a flow chart illustrating receive side processing of a policy enabled information sharing system, in accordance with an embodiment of the invention.

FIG. 5 is a flow chart illustrating receive side processing of policy enabled information sharing system 100, in accordance with an embodiment of the invention. The order in which some or all of the process blocks appear in process 500 should not be deemed limiting. Rather, one of ordinary skill in the art having the benefit of the present disclosure will understand that some of the process blocks may be executed in a variety of orders not illustrated.

In a process block 505, key master 155 of the receiving entity receives the data object distributed over communication channel 115. Key master 155 can either provide the received data object for immediate receipt by data receiver 165 or save it for later recall (decision block 510). If the received data object is to be saved, then key master 155 may stored the data object into receiving database 180 without decrypting it (process block 515). In some scenarios, the encryption may be removed prior to storing the data object into receiving database 180 (not illustrated).

To decrypt the data object, key master 155 retrieves the appropriate decryption key(s) 175 from key store 170 previously distributed to the receiving entity via secure channels. The appropriate decryption keys 175 may be determined on a per content portion basis with reference to the visibility attributes 415. Alternatively, a single or default decryption key for the entire data object may be indicated with reference to the global visibility attribute thereby negating the use of some or all of the individual visibility attributes 415. If one or more of the decryption keys 175 have expired or been revoked (decision block 525), then key master 155 is blocked from decrypting the corresponding content portions (process block 530).

In a process block 535, the key master 155 decrypts those portions of the data object for which the receiving entity has authorized access and possesses valid decryption keys. In a process block 540, the decrypted data object is passed to receiving adapter 160 for reformatting back into a data file usable by data receiver 165. Receiving adapter 160 may reformate the data object back into the original data file format or convert the data object into a file format that is specifically tailored to the needs of data receiver 165 and different from the original file format used by data source 120. Finally, in a process block 545, data receiver 165 accesses the reformatted data file for use by the end user of the receiving entity.

Figure 6:
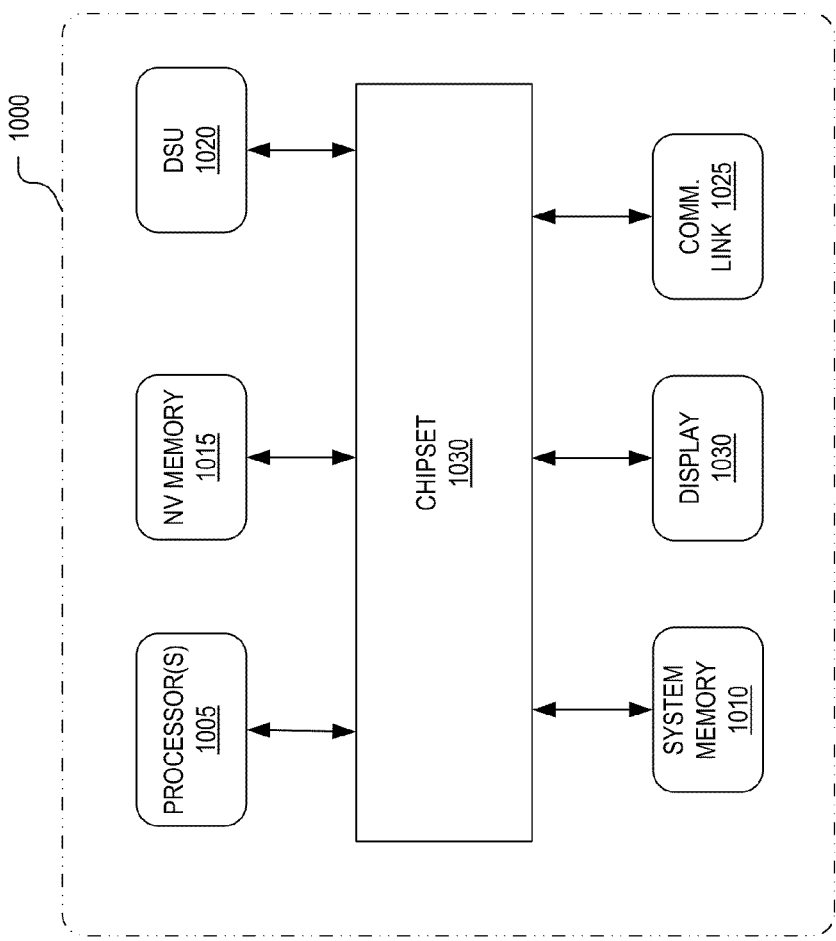
FIG. 6 is a functional block diagram illustrating a demonstrative processing system for implementing embodiments of the invention.

FIG. 6 is a block diagram illustrating a demonstrative processing system 600 for executing processes 200 or 500. The illustrated embodiment of processing system 600 includes one or more processors (or central processing units) 605, system memory 610, nonvolatile ("NV") memory 615, a DSU 620, a communication link 625, and a chipset 630. The illustrated processing system 600 may represent any computing system including a desktop computer, a notebook computer, a workstation, a handheld computer, a server, a blade server, or the like.

The elements of processing system 600 are interconnected as follows. Processor(s) 605 is communicatively coupled to system memory 610, NV memory 615, DSU 620, and communication link 625, via chipset 630 to send and to receive instructions or data thereto/therefrom. In one embodiment, NV memory 615 is a flash memory device. In other embodiments, NV memory 615 includes any one of read only memory ("ROM"), programmable ROM, erasable programmable ROM, electrically erasable programmable ROM, or the like. In one embodiment, system memory 610 includes random access memory ("RAM"), such as dynamic RAM ("DRAM"), synchronous DRAM, ("SDRAM"), double data rate SDRAM ("DDR SDRAM"), static RAM ("SRAM"), and the like. DSU 620 represents any storage device for software data, applications, and/or operating systems, but will most typically be a nonvolatile storage device. DSU 620 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 620 is illustrated as internal to processing system 600, DSU 620 may be externally coupled to processing system 600. Communication link 625 may couple processing system 600 to a network such that processing system 600 may communicate over the network with one or more other computers. Communication link 625 may include a modem, an Ethernet card, a Gigabit Ethernet card, Universal Serial Bus ("USB") port, a wireless network interface card, a fiber optic interface, or the like.

It should be appreciated that various other elements of processing system 600 have been excluded from FIG. 6 and this discussion for the purposes of clarity. For example, processing system 600 may further include a graphics card for rendering images to a screen (e.g., rendering data files to a screen), additional DSUs, other persistent data storage devices (e.g., tape drive), and the like. Chipset 630 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 630. Correspondingly, processing system 600 may operate without one or more of the elements illustrated. For example, processing system 600 need not include DSU 620.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (e.g., stores) information in a form accessible by a machine (e.g., a computer, network device, personal digital assistant, manufacturing tool, any device with a set of one or more processors, etc.). For example, a computer-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for dynamically sharing information, the method comprising:

formatting a data file to be shared with a receiving entity into a data object including a file data portion and a sharing metadata portion;

executing a sharing policy indicating when to share the data object responsive to an occurrence of an event;

encrypting the data object; and automatically transmitting the data object to the receiving entity upon occurrence of the event, wherein the sharing metadata portion includes metadata characterizing the data file and referenced in connection with the sharing policy to determine when to automatically transmit the data object to the receiving entity;

wherein the sharing metadata portion includes visibility attributes that determine if the receiving entity may view content portions of the data file without prompting by the receiving entity; and wherein executing the sharing policy indicating when to share the data object responsive to the occurrence of the event comprises:

monitoring for the occurrence of the event from a plurality of different events;

determining recipients of need-to-know information based on a type of the event; and selecting the data file as need-to-know information, if the metadata associated with the data file identifies at least one of the recipients of the need-to-know information for sharing with a variety of different recipients based on which one of the plurality of different events occurs.

2. The method of claim 1, further comprising prior to formatting the data file, marking the content portions of the data file with the visibility attributes.

3. The method of claim 2, wherein formatting the data file comprises:

populating the file data portion with the content portions of the data file; and tagging the content portions with the visibility attributes.

4. The method of claim 3, wherein the visibility attributes include at least first and second visibility attributes, and wherein encrypting the data object comprises:

encrypting the content portions tagged with the first visibility attribute with a first encryption key; and encrypting the content portions tagged with the second visibility attribute with a second encryption key different than the first encryption key to provide differentiated visibility scopes to the content portions within the data file.

5. The method of claim 3, wherein formatting the data file to be shared with the receiving entity into the data object further comprises:

excluding selected content portions of the data file from inclusion in the data object, if the selected content portions are marked with one or more visibility attributes requiring a higher level of authorization credentials than possessed by the receiving entity.

6. The method of claim 2, further comprising:

identifying decryption keys for decrypting the content portions;

securely distributing a first portion of the decryption keys to the receiving entity of which the receiving entity is identified as being authorized to receive; and omitting a second portion of the decryption keys from being distributed to the receiving entity of which the receiving entity is identified as not being authorized to receive.

7. The method of claim 1, further comprising:

changing an authorization level of the receiving entity in response to an occurrence of a specified event in the sharing policy; and distributing additional decryption keys to the receiving entity or revoking decryption keys from the receiving entity in response to the occurrence of the specified event.

8. A computer-readable, non-transitory, storage medium that provides instructions that, when executed by a computer, will cause the computer to perform operations comprising:

formatting a data file to be shared with a receiving entity into a data object including a file data portion and a sharing metadata portion;

executing a sharing policy indicating when to share the data object responsive to an occurrence of an event;

encrypting the data object; and automatically transmitting the data object to the receiving entity upon occurrence of the event, wherein the sharing metadata portion includes metadata characterizing the data file and referenced in connection with the sharing policy to determine when to automatically transmit the data object to the receiving entity;

wherein the sharing metadata portion includes visibility attributes that determine if the receiving entity may view content portions of the data file without prompting by the receiving entity; and wherein executing the sharing policy indicating when to share the data object responsive to the occurrence of the event comprises:

monitoring for the occurrence of the event from a plurality of different events;

determining recipients of need-to-know information based on a type of the event; and selecting the data file as need-to-know information, if the metadata associated with the data file identifies at least one of the recipients of the need-to-know information for sharing with a variety of different recipients based on which one of the plurality of different events occurs.

9. The computer-readable, non-transitory, storage medium of claim 8, further providing instructions that, when executed by the computer, will cause the computer to perform further operations, comprising:

prior to formatting the data file, marking content portions of data file with visibility attributes, wherein formatting the data file comprises:

populating the file data portion with the content portions of the data file; and tagging the content portions with the visibility attributes.

10. The computer-readable, non-transitory, storage medium of claim 9, wherein the visibility attributes include at least first and second visibility attributes, and wherein encrypting the data object comprises:

encrypting the content portions tagged with the first visibility attribute with a first encryption key; and encrypting the content portions tagged with the second visibility attribute with a second encryption key different than the first encryption key to provide differentiated visibility scopes to the content portions within the data file.

11. The computer-readable, non-transitory, storage medium of claim 9, wherein formatting the data file to be shared with the receiving entity into the data object further comprises:

excluding selected content portions of the data file from inclusion in the data object, if the selected content portions are marked with one or more visibility attributes requiring a higher level of authorization credentials than possessed by the receiving entity.

12. The computer-readable, non-transitory, storage medium of claim 8, further providing instructions that, when executed by the computer, will cause the computer to perform further operations, comprising:

changing an authorization level of the receiving entity in response to an occurrence of a specified event in the sharing policy; and distributing additional decryption keys to the receiving entity or revoking decryption keys from the receiving entity in response to the occurrence of the specified event.

13. A computing system comprising:

one or more processors to execute instructions; and one or more memory units storing the instructions that when executed by the one or more processors, will cause the computing system to perform operations comprising:

formatting a data file to be shared with a receiving entity into a data object including content portions and sharing metadata;

executing a sharing policy indicating when to share the data object responsive to an occurrence of an event;

encrypting the data object; and automatically transmitting the data object to the receiving entity upon occurrence of the event, wherein the sharing metadata includes metadata characterizing the content portions and referenced in connection with the sharing policy to determine when to automatically transmit the data object to the receiving entity;

wherein the sharing metadata portion includes visibility attributes that determine if the receiving entity may view content portions of the data file without prompting by the receiving entity; and wherein executing the sharing policy indicating when to share the data object responsive to the occurrence of the event comprises:

monitoring for the occurrence of the event from a plurality of different events;

determining recipients of need-to-know information based on a type of the event; and selecting the data file as need-to-know information, if the metadata associated with the data file identifies at least one of the recipients of the need-to-know information for sharing with a variety of different recipients based on which one of the plurality of different events occurs.

14. The computing system of claim 13, where the one or more memory units further store instructions that, when executed by the one or more processors, will cause the computing system to perform further operations, comprising:

prior to formatting the data file, selecting portions of the data file; and marking the selected portions of the data file with visibility attributes, wherein formatting the data file comprises:

populating the content portions of the data object with the selected portions of the data file; and tagging the content portions with the visibility attributes.

15. The computing system of claim 14, wherein the visibility attributes include at least first and second visibility attributes, and wherein encrypting the data object comprises:

encrypting the content portions tagged with the first visibility attribute with a first encryption key; and encrypting the content portions tagged with the second visibility attribute with a second encryption key different than the first encryption key to provide differentiated visibility scopes to the content portions within the data file.

16. The computing system of claim 14, wherein formatting the data file to be shared with the receiving entity into the data object further comprises:

excluding second selected content portions of the data file from inclusion in the data object, if the second selected content portions are marked with one or more visibility attributes requiring a higher level of authorization credentials than possessed by the receiving entity.

* * * * *